(12) United States Patent
Ingham

(10) Patent No.: X6492
(45) Date of Patent: Apr. 19, 1831

(54) CANAL NAVIGATION, BY BOATS

(76) Inventor: Samuel D. Ingham

(Saml. D. Ingham – Letters Patent, dated April 19. 1831)

The Schedule referred to in these Letters Patent and making part of the same, containing a description in the words of the said Samuel D. Ingham himself of his improvement in the navigation of canals by boats.

To all to whom these presents shall come;

Be it known that I, Samuel D. Ingham of the County of Bucks and State of Pennsylvania, now residing in the City of Washington, have invented a new and useful improvement in the Navigation of Canals by boats of which the following is a full and exact description as invented and improved by me.

This invention consists in the construction of a boat with a paddle wheel or wheels, located in its forward part or bow, which wheels may be applied to any form of boat now in use, but most advantageously to that form usually denominated a twin boat.

In the application of the bow wheel to the twin boat there may be one or more wheels affixed in the same line of direction on the centre of a transverse section of the bow in such position as to propel the water along the interstice between the twin parts of the boat, or if the canal be wide in proportion to the burden of the boat a wheel may be placed on each side of the bow.

These wheels may be propelled by steam or any other power, if the former, the most efficient and simple adaptation for the twin boat will be one boiler and a double engine, one on each side with horizontal pistons connected with cranks of the wheel at right angles to each other, when a single boat is used with a bow wheel on each side, they may be connected with the engine, according to any of the various modes by which the wheels located in other parts of the boat can or may be connected.

The object and operation of this structure of boats and position of the wheels is to prevent the swell of water in front
of the boat and depression of it in the rear which occurs when
boats are towed by a power on the shore or propelled by pad-
dle wheels on the sides or in the quarter or stern. When the above
described swell & depression exist, the boat in its progress must
ascend a plane whose inclination is directly as the difference
between the heights of the water at the bow and the stern and
inversely as the length of the boat, consequently an increased power
is required to propel it and unless the canal be deeper than necessa-
ry to float the vessel on a level its stern will ground.

Another object of this structure is to prevent the currents a-
long the margin of the canal which must occur whenever
the action of the boat or wheels shall have materially disturbed
the level of the water. This is effected by propelling the water
from the front to the rear as the boat advances, thus maintain-
ing the boat on a level plane, and inasmuch as the
action of the wheel upon the water must be equal to that
of the boat on the same fluid in the opposite direction, there
must be as much water displaced and removed from bow
to stern by the wheels as will maintain the level; and this
current being made to pass rapidly through the middle of a
twin boat the level is preserved or so immediately restored that
no injury can be done to the banks of the canal by the effort
of the water to find its level along the margin; and the
action of the current on the bottom, by keeping the water
disturbed and carrying off the alluvion must effectually pre-
vent the accumulation of bars and shoals by the deposit from
muddy feeders.

The drawing and specification of a twin boat
and one wheel which are herewith deposited are referred
to as descriptive of the structure of that species of
boat. The same position of wheel being adapted to a triple or single boat, this description is deemed sufficient to enable any competent mechanic to fix the wheel or wheels upon a boat of any form.

In witness whereof I hereunto subscribe my name

Witnesses

Aubrey Dickens

Gilbert Rodman 700 words

S. D. Cupham

Ed

J J Ro